(12) United States Patent
Kress (10) Patent No.: US 12,194,708 B2
(45) Date of Patent: Jan. 14, 2025

(54) THERMALLY INSULATED PIPE

(71) Applicant: Brugg Rohr AG Holding, Brugg (CH)

(72) Inventor: Jürgen Kress, Oberwil-Lieli (CH)

(73) Assignee: BRUGG ROHR AG HOLDING, Brugg (CH)

(*) Notice: Subject to any disclaimer, the term of this patent is extended or adjusted under 35 U.S.C. 154(b) by 201 days.

(21) Appl. No.: 17/802,600

(22) PCT Filed: Feb. 23, 2021

(86) PCT No.: PCT/EP2021/054429
§ 371 (c)(1),
(2) Date: Aug. 26, 2022

(87) PCT Pub. No.: WO2021/170573
PCT Pub. Date: Sep. 2, 2021

(65) Prior Publication Data
US 2023/0093106 A1 Mar. 23, 2023

(30) Foreign Application Priority Data
Feb. 26, 2020 (EP) .................................. 20159569

(51) Int. Cl.
| | | |
|---|---|---|
| *B32B 1/08* | (2006.01) | |
| *B32B 5/20* | (2006.01) | |
| *B32B 7/022* | (2019.01) | |
| *B32B 7/027* | (2019.01) | |
| *B32B 27/06* | (2006.01) | |
| *B32B 27/32* | (2006.01) | |

(Continued)

(52) U.S. Cl.
CPC ............... *B32B 1/08* (2013.01); *B32B 5/20* (2013.01); *B32B 7/022* (2019.01); *B32B 7/027* (2019.01);

(Continued)

(58) Field of Classification Search
CPC .. B32B 1/08; B32B 5/20; B32B 7/022; B32B 7/027; B32B 27/065; B32B 27/32;
(Continued)

(56) References Cited

U.S. PATENT DOCUMENTS

| | | | |
|---|---|---|---|
| 9,862,127 B2* | 1/2018 | Bronnum | F16L 59/143 |
| 2007/0102055 A1* | 5/2007 | Blair | F16L 59/02 |
| | | | 138/148 |

FOREIGN PATENT DOCUMENTS

| | | |
|---|---|---|
| DE | 102012112280 A1 | 6/2014 |
| EP | 0897788 A1 | 2/1999 |

(Continued)

OTHER PUBLICATIONS

International Search Report mailed on Mar. 18, 2021, in connection with corresponding International Application No. PCT/EP2021/054429 (9 pp., including machine-generated English translation).

*Primary Examiner* — Michael C Miggins
(74) *Attorney, Agent, or Firm* — McCormick, Paulding & Huber PLLC (57) ABSTRACT

Thermally insulated pipes including thermal insulation, outer jacket and medium pipes, wherein the thermal insulation includes a foam having a density of 30-80 kg/m3, the outer jacket includes a thermoplastic plastic (21) having a modulus of 300-1400 MPa and having a corrugated shape. The invention further relates to the use as well as the manufacture of such tubes. Furthermore, the invention relates to composite materials, their use for thermal insulation, as well as their manufacture.

35 Claims, 3 Drawing Sheets

(51) Int. Cl.
*B32B 27/40* (2006.01)
*B32B 38/00* (2006.01)

(52) U.S. Cl.
CPC ............ *B32B 27/065* (2013.01); *B32B 27/32* (2013.01); *B32B 27/40* (2013.01); *B32B 38/0012* (2013.01); *B32B 2266/0278* (2013.01); *B32B 2266/08* (2013.01); *B32B 2307/304* (2013.01); *B32B 2307/72* (2013.01); *B32B 2307/732* (2013.01); *B32B 2597/00* (2013.01)

(58) Field of Classification Search
CPC ................ B32B 27/40; B32B 38/0012; B32B 2266/0278; B32B 2266/08; B32B 2307/304; B32B 2307/72; B32B 2307/732; B32B 2597/00
See application file for complete search history.

(56) References Cited

FOREIGN PATENT DOCUMENTS

| | | |
|---|---|---|
| EP | 1471299 A1 | 10/2004 |
| EP | 1840444 A1 | 10/2007 |
| EP | 2340929 A1 | 7/2011 |
| EP | 2378173 A2 | 10/2011 |
| EP | 3584070 A1 | 12/2019 |
| WO | 2014134745 A1 | 9/2014 |
| WO | 2018219916 A1 | 12/2018 |

* cited by examiner

THERMALLY INSULATED PIPE

CROSS-REFERENCE TO RELATED APPLICATION

This application is a National Stage application of International Patent Application No. PCT/EP2021/054429, filed on Feb. 23, 2021, which claims priority to European Application 20159569.1, filed Feb. 26, 2020, each of which is hereby incorporated by reference in its entirety.

TECHNICAL FIELD

The invention relates to thermally insulated pipes with specific thermal insulation and specific outer jacket, their use and their manufacture. Furthermore, the invention relates to composite materials, their use for thermal insulation, as well as their production.

BACKGROUND

Thermally insulated pipes are known and used in many areas, in particular for the provision of district heating, local heating and cooling, both in industry and in households. Such thermally insulated pipes (1) comprise at least one medium-carrying medium pipe (4), a surrounding thermal insulation (3) and an outer jacket (2). Suitable medium pipes (4) are made of metal or plastic, the insulation (3) of one or more insulating materials, and the outer jacket (2) of plastic or metal.

There are numerous manufacturing methods for such insulated pipes, for example continuously operating methods according to WO2018/219916, EP0897788, WO2019/214954 and WO2008/142211. These methods are suitable for manufacturing pipes of any length ("endless pipes"). The thermally insulated pipes produced in this way can either be wound on a drum immediately after production and then made up into coils of the desired length or cut directly to length in bars of the desired length.

The pipes on the market are dominated by those with insulating materials based on polyurethane (PUR) or polyisocyanurate (PIR) or based on thermoplastic foams.

The PUR or PIR foams are formed during the production process from a liquid two-component mixture ("2K mixture"), which in turn consists of polyols and isocyanates in a defined mixing ratio. This 2K mixture cross-links during the manufacturing process and therefore results in good adhesion to the medium pipe (4) (frictional contact) and—depending on the selected manufacturing process—also to the outer jacket (2). Such pipe systems are so-called composite systems and are subject to the standards EN 15632-1:2009+A1:2014 (E) and EN 15632-2:2010+A1:2014 for district and local heating applications.

Pipes with insulating materials based on thermoplastic foams typically use prefabricated mats made of the corresponding thermoplastic, e.g. polyethylene (PE). The medium pipes provided with them are surrounded on the outside by a jacket of PE, which is either applied directly by extrusion or is also prefabricated. There is normally no frictional contact to the medium pipes and to the outer jacket. Such pipe systems are so-called non-composite systems and are subject to the standards EN 15632-1:2009+A1:2014 (E) and EN 15632-3: 2010+A1:2014 for district and local heating applications.

Composite systems typically superior to comparable non-composite systems in terms of thermal insulation, especially since they are longitudinally watertight. Non-composite systems, however, have the advantage of easy bendability with comparable outer diameters.

Finally, it is known that pipes with a so-called corrugated jacket can be bent more easily, i.e. the bending forces are lower. This proves advantageous when laying the pipes. The manufacture of such pipes is described, for example, in CH714968 and EP1840444.

SUMMARY

There is a general need for alternative, in particular improved, thermally insulated pipes. It has been shown that insulation values achieved under the above test conditions often cannot be fully realized in practice. Furthermore, it is desirable to provide thermally insulated pipes that allow a small bending radius and meet the above standards. Furthermore, it is desirable to provide thermally insulated pipes whose outside diameter is small and which meet the above standards.

It is therefore the objective of the invention to provide a thermally insulated pipe which solves one or more of the above-mentioned disadvantages.

The objectives outlined above are met according to the independent claims. The dependent claims represent advantageous embodiments. Further advantageous embodiments can be found in the description and the figures. The general, preferred and particularly preferred embodiments, ranges, etc., given in connection with the present invention may be combined with one another as desired. Likewise, individual definitions, embodiments, etc. may be omitted or not relevant.

The present invention is described in detail below. Thereby the invention relates to
  in a first aspect thermally insulated pipes and their use;
  in a second aspect, their production;
  in a third aspect, composite materials and their use, including use in the pipes according to the first aspect of the invention; and
  in a fourth aspect, the production of such composite materials.

It is understood that the various embodiments, preferences and ranges disclosed and described below may be combined in any desired manner. In particular, the embodiments of the first aspect are transferable to the third aspect of the invention. Furthermore, depending on the embodiment, individual definitions, preferences and ranges may not apply. Further, the term "comprising" includes the meanings "comprising" and "consisting of". The terms used in the present invention are used in the generally accepted sense familiar to those skilled in the art.

The term "modulus of elasticity" (English: "Young's Modulus") is abbreviated to "modulus" in the context of the present invention. The modulus is a known material parameter; it increases with the resistance that a material offers to its elastic deformation. A component made of a material with a high modulus is thus stiffer than the same component made of a material with a low modulus.

BRIEF DESCRIPTION OF THE DRAWINGS

The present invention is further illustrated by the figures.

(E) Medium pipe (4), where (C), (D) and (E) together form the pipe (1) according to the invention.

DETAILED DESCRIPTION

In a first aspect, the invention thus relates to a thermally insulated line pipe (1) comprising at least one medium pipe (4), at least one thermal insulation (3) arranged around the medium pipe and at least one outer jacket (2) arranged around the thermal insulation, characterized in that said thermal insulation (3) comprises a foam (31) having a density of 30-80 kg/m$^3$ according to ISO 845:2006, preferably having a modulus of 10-30 MPa according to DIN EN ISO 527-4:1997-07, preferably having a compressive strength of 0.1-0.3 MPa according to ISO 844:2014 at 10% compression and preferably at least 60% closed-cell; and said outer jacket (2) comprises a thermoplastic material (21) having a waveform of the outer jacket (22), in particular having a corrugated structure, and having a modulus of 300-1400 MPa according to DIN EN ISO 527-4:1997-07. Preferably, the foam (31) is a foam that is at least 60% closed-cell, preferably at least 65%, most preferably at least 75%, according to ISO 4590, Third Edition, 2016 Jul. 15.

The thermally insulated pipes according to the invention thus have a specific combination of mechanical, structural and chemical parameters. Due to the combination of these features, the inventive pipes combine the advantages of the known open-cell PE-insulated pipes with the advantages of the known closed-cell PU-insulated pipes. As explained below, the material properties of the thermal insulation (3) and of the outer jacket (2) and the jacket geometry of the outer jacket complement each other sensibly within the ranges defined here. As a result, the pipe according to the invention can simultaneously meet the requirements for stability, flexibility and thermal insulation. This aspect of the invention will be explained in more detail below.

Pipe (1):

Thermally insulated pipes are known per se. As already mentioned, these comprise at least one medium pipe (4), at least one thermal insulation (3) arranged around the medium pipe and at least one outer jacket (2) arranged around the thermal insulation.

In one embodiment of the invention, the medium pipe (4) and the thermal insulation (3) form a composite. In a further embodiment of the invention, the outer jacket (2) and the thermal insulation (3) form a composite. In a further embodiment of the invention, the outer jacket (2) and the thermal insulation (3) and the medium pipe (4) form a composite. By composite formation is meant the frictional contact between said structural elements. This can be produced, for example, by fusing or bonding.

In one embodiment of the invention, a foil (5) is arranged between the outer jacket (2) and the thermal insulation (3). Such a foil may be present due to the manufacturing process. In this embodiment, a certain flexibility is achieved between the thermal insulation and the outer jacket. It is observed that the foil (5) is partially, completely or even not at all welded to the outer jacket (2). In particular, in the case of a corrugated shape in the outer jacket, an essentially form-fitting, not a material-fitting, bond is thus achieved. Accordingly, in a further embodiment the invention relates to a pipe in which a foil (5) is arranged between the outer jacket (2) and the thermal insulation (3) and a form-fitting bond is present between the outer jacket (2) and the thermal insulation (3).

In one embodiment of the invention, no foil is arranged between the outer jacket (2) and the thermal insulation (3). Such a simpler construction is particularly cost-effective. Accordingly, in a further embodiment the invention relates to a pipe in which no foil (5) is arranged between the outer jacket (2) and the thermal insulation (3) and there is a material bond between the outer jacket (2) and the thermal insulation (3).

The foil used can be of various types. It can be a single-layer foil consisting of only one material. It can also be a composite of two or more layers, which in turn can consist of the same or different materials. The thickness of the individual layers can also vary. The multilayer foils can be produced, for example, by lamination or foil extrusion. Suitable materials are known to the skilled person and are selected in particular from the group comprising polyethylene, polyamide, polyester, polypropylene and their co-polymers and blends. The individual layer thicknesses can be in the range of 0.005-0.1 mm. The total thickness can be 0.01-0.2 mm, preferably 0.02-0.15 mm. The foils may further have a surface treatment, e.g. a corona treatment.

In one embodiment of the invention, the pipe exhibits particularly good values in the deflection test according to the examples for LLDPE; likewise for soft polyurethane as thermal insulation. These two parameters act synergistically with each other, so that pipes (1) according to the invention which have a soft foam (31) as thermal insulation and LLDPE as polymer (21) of the jacket are particularly preferred. This is explained in more detail below and in the examples.

In one embodiment of the invention, the line pipe has values of at least 4 KN/m$^2$ for the ring stiffness according to SN EN ISO 9969, 2016-05, preferably at least 10 KN/m$^2$, most preferably 15 KN/m$^2$. This parameter is suitable for characterizing the line pipe stability. For many applications of the thermally insulated pipes described here, the ring stiffness plays an important role. High values are considered advantageous. If the ring stiffness were too low, the line pipe would collapse under the load of the soil, for example.

Corrugated/undulated pipes, which contain no foam and no medium pipe (e.g. sewage pipes), show typical values of 2-4 kN/m², according to DIN 4262-1:2009-10. Such commercially available pipes are typically made of HDPE. HDPE has a relatively high modulus and is used to achieve the required ring stiffness. A material such as LLDPE or LDPE would not be considered here because of its lower modulus.

Surprisingly, it was found that the pipes according to the invention have a ring stiffness of over 10 kNm², often over 40 kN/m², measured according to ISO 9967_2016. Such values could also be realized for thermoplastic polymers (21) from the group comprising LDPE and LLDPE, in particular LLDPE and blends or melts of LLDPE and LDPE. As noted above, this is counter-intuitive to the skilled person, since even such a material with a low modulus results in pipes with high annular stiffness. However, for flexible pipes, LDPE and especially LLDPE is preferred, because of the lower bending forces. It is therefore possible to provide pipes that combine opposing parameters, namely the desired low bending forces and the desired high ring stiffness. The invention thus also relates to pipes as described here, in which the thermoplastic polymer is selected from the group comprising LDPE and LLDPE, in particular LLDPE, and the ring stiffness has values of over 10 kNm², preferably over 15 kN/m².

In one embodiment of the invention, the pipe meets the longitudinal water tightness requirement of EN 15632-2: 2010+A1:2014.

Figure 3:
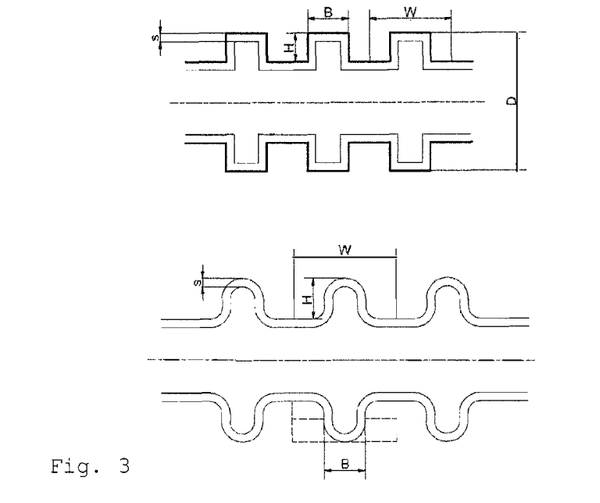
FIG. 3 explains the structure of the corrugated jacket and the designations used (not to scale): The wavelength W, the ridge width B, the ridge height H, the wall thickness s as a function of the outer diameter D. The corrugated structure is shown above and the sinusoidal structure below.

In one embodiment of the invention, the line pipe has an advantageous jacket geometry. Accordingly, pipes according to the invention have ridges and valleys on the outside which extend transversely to a longitudinal axis of the pipe over an entire pipe circumference and alternate in the direction of the longitudinal axis, the pipe having an outside diameter D between two opposite, highest points of a ridge. Provided that the highest points of a ridge form a line, the corresponding jacket geometry is called sinusoidal. If the highest points of a ridge form a jacket geometry is called surface, the corresponding corrugated. This is shown schematically in FIG. 3. Accordingly, the undulated (corrugated FIG. 3 top or sinusoidal FIG. 3 bottom) outer jacket is characterized by the wavelength W, the height of the ridges H, the width of the ridges B. These parameters depend on the outer diameter D and are adapted to it. Depending on the outer diameter D, the following preferred geometries for the corrugated jacket are obtained; the general, preferred and particularly preferred parameter range is given in each case; the parameters D, W, B and H as well as s can be taken from FIG. 3:

| Outside-diameter D — Area from-to [mm-mm] | Wavelength W general In percent of D from-to [%-%] | Wavelength W preferred In percent of D from-to [% of D] | Wavelength W especially preferred In percent of D from-to [% of D] |
| --- | --- | --- | --- |
| 40-70 | 4-40 | 12-28 | 16-23 |
| 71-100 | 4-40 | 8-23 | 12-18 |
| 101-130 | 3-40 | 7-22 | 11-17 |
| 131-160 | 3-40 | 6-21 | 10-16 |
| 161-250 | 2-40 | 4-20 | 8-15 |

| Outer diameter D — Area from-to Outer diameter D [mm-mm] | Ridge width B — In percent of D from-to Ridge width B [%-%] | Ridge width B preferred In percent of D from-to Ridge width B [ % of D] | Ridge width B mostly preferred In percent of D from-to Ridge width B [% of D] |
| --- | --- | --- | --- |
| 40-70 | 5-50 | 9-25 | 12-18 |
| 71-100 | 4-50 | 6-25 | 9-15 |
| 101-130 | 3-50 | 5-23 | 8-14 |
| 131-160 | 2-50 | 4-23 | 7-13 |
| 161-250 | 1-50 | 3-23 | 6-13 |

| Outer diameter D — Area from-to [mm-mm] | Ridge height H — In percent of D from-to [%-%] | Ridge height H preferred In percent of D from-to [ % of D] | Ridge height H mostly preferred In percent of D from-to [ % of D] |
| --- | --- | --- | --- |
| 40-70 | 3-25 | 4-15 | 5-11 |
| 71-100 | 2-25 | 3-14 | 4-10 |
| 101-130 | 1-25 | 2-13 | 3-9 |
| 131-160 | 1-25 | 2-12 | 3-8 |
| 161-250 | 1-25 | 1-11 | 2-7 |

Such a waveform (both corrugated and sinusoidal) of the pipe is initially counter-intuitive, since an increase in surface area is contrary to the desired insulation. However, the insulation values are practically unaffected by this waveform. Without feeling bound to a theory, the choice of this geometry succeeds in combining various advantages: on the one hand, they increase the bendability of the pipe, and on the other hand, they stabilize the entire pipe so that it does not give way under ground load, i.e. does not collapse.

In order to obtain the lowest possible bending forces, it is advantageous to select the outer diameter of the insulated pipes as low as possible.

Figure 1A:
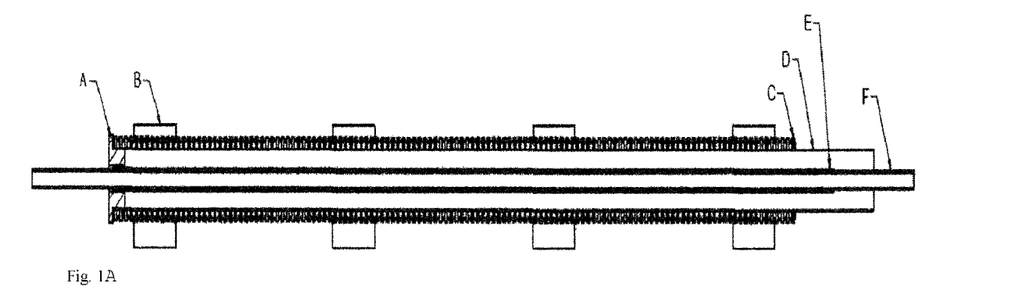
FIG. 1A shows the set-up for manufacturing the pipes according to the invention as shown in Ex. 2. It refers to:
  (A) flange; (B) mold jaw, (F) inner pipe; and
  (C) corrugated outer jacket (2)
  (D) Thermal insulation (3) with foil (5)
Figure 1B:
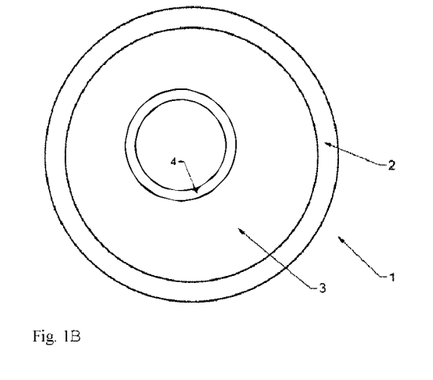
FIGS. 1B and 1C show two embodiments of the pipe (1) according to the invention, once with one medium pipe and without foil, once with two medium pipes and a foil.

Accordingly, the following outside diameters D are preferred if a single medium pipe is present (FIG. 1B):

| Outside diameter medium pipe (4) [mm] | Outside diameter D of the pipe (1) smaller than [mm] |
| --- | --- |
| 20 | 76 |
| 25 | 76 |
| 32 | 76 |
| 40 | 91 |
| 50 | 111 |
| 63 | 126 |
| 75 | 142 |
| 90 | 162 |
| 110 | 162 |
| 125 | 182 |
| 140 | 202 |
| 160 | 250 |

The invention thus also relates to thermally insulated pipes as described here, with outside diameters of pipe (1) and medium pipe (4) assuming the values given here.

Figure 1C:
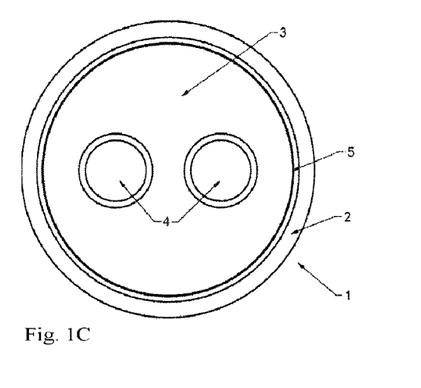
Figure 1D:
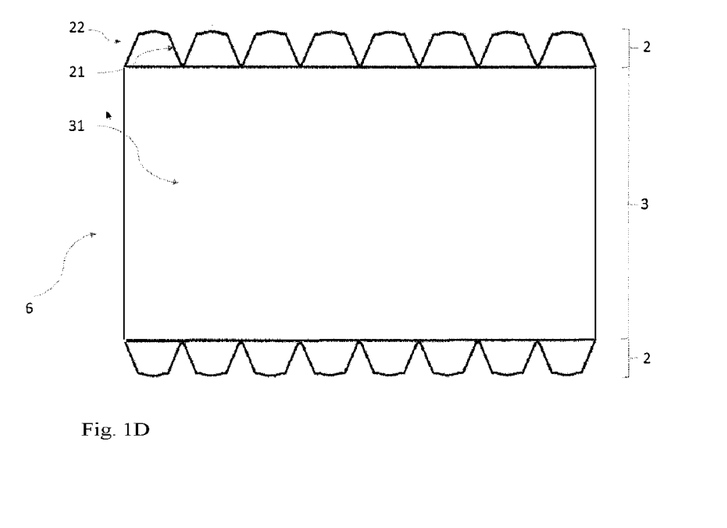
FIG. 1D shows an embodiment of the composite material (6) according to the invention.

Accordingly, the following outside diameters D are preferred if two medium pipes are present (FIG. 1C):

| Outside diameter of the medium pipes (4) [mm/mm] | Outside diameter of pipe smaller than [mm] |
|---|---|
| 20/20 | 90 |
| 25/25 | 90 |
| 32/32 | 105 |
| 40/40 | 125 |
| 50/50 | 160 |
| 63/63 | 180 |
| 75/75 | 200 |
| 90/90 | 250 |

The invention thus also relates to thermally insulated pipes as described here, where the outside diameter of pipe (1) and the two medium pipes (4) assume the values given here.

Thermally insulated pipes (1) in which the medium pipe (4) and thermal insulation (3) form a composite, which have a foil (5) between the thermal insulation (3) and the outer jacket (2) and which have one or more, in particular all, of the values mentioned here for ring stiffness, deflection test and longitudinal water tightness prove to be particularly suitable.

Thermally insulated pipes (1) which additionally fulfil the following parameters with regard to wall thickness s have proved to be particularly suitable; the general, preferred and mostly preferred parameter range is indicated in each case; furthermore, the wall thickness s is measured in the upper region of the ridge, cf. figures.

| Outside-diameter D Area from-to [mm-mm] | Wall thickness s — from-to [mm-mm] | Wall thickness s preferred from-to [mm-mm] | Wall thickness s mostly preferred from-to [mm-mm] |
|---|---|---|---|
| 40-70 | 0.5-4.5 | 0.8-3.5 | 1.0-3.0 |
| 71-100 | 0.5-4.5 | 0.9-3.6 | 1.1-3.1 |
| 101-130 | 0.5-5.0 | 1.0-4.0 | 1.2-3.5 |
| 131-160 | 0.6-5.5 | 1.1-4.5 | 1.3-4.0 |
| 161-250 | 0.6-6.5 | 1.3-5.5 | 1.5-5.0 |

Thermally insulated pipes (1) which additionally meet the following parameters with regard to the weight per meter of the pipe (1) have also proved to be particularly suitable, the general, preferred and mostly preferred parameter range being indicated in each case:

| Outside diameter D Area from-to [mm-mm] | Weight per meter — from-to [kg/m-kg/m] | Weight per meter preferred from-to [kg/m-kg/m] | Weight per meter mostly preferred from-to [kg/m-kg/m] |
|---|---|---|---|
| 40-70 | 0.2-2.0 | 0.3-1.5 | 0.5-1.2 |
| 71-100 | 0.5-2.4 | 0.6-2.3 | 0.7-2.2 |
| 101-130 | 0.6-4.0 | 0.8-3.5 | 1.0-3.0 |
| 131-160 | 0.8-6.5 | 1.0-5.5 | 1.2-4.5 |
| 161-250 | 1.0-12.0 | 1.2-11.0 | 1.6-10.0 |

Outer Jacket (2):

In principle, all outer jackets suitable for thermally insulated pipes can be used. Suitable outer jackets are designed as flexible pipe sections and have a corrugated shape, i.e. they are designed as flexible corrugated pipes as shown in FIG. 3; in particular as flexible pipes with a corrugated structure.

A wide range of materials for the outer jacket is suitable. Such cladding materials are known per se and are commercially available or produced by known processes. Thermoplastic polymers are particularly suitable. Polyolefins, such as polyethylenes (PE) and polypropylenes (PP), are preferred. Suitable are high density PE (HDPE), low density PE (LDPE), linear low density PE (LLDPE), especially LLDPE.

In one embodiment of the invention, the thermoplastic polymers have a melt flow rate (MFR) of 0.1-25 g/10 min, preferably 0.2-20 g/10 min, most preferably 0.3-15 g/10 min, measured at a load of 2.16 kg and a temperature of 190° C. according to DIN EN ISO 1133/2012.

In one embodiment of the invention, the thermoplastic polymers have a modulus of 300-1400 MPa, preferably 350-1300 MPa, most preferably 400-800 MPa, determined according to the SN EN ISO 527-2/2012 standard. The modulus measured according to this standard is a modulus of elasticity (Young's modulus).

In one embodiment of the invention, the thermoplastic polymers have a density of 870-940 kg/m$^3$ determined according to ISO 1183-1/2019.

In one embodiment of the invention, the thermoplastic polymers contain less than 3 wt. % additive to increase UV stability (24), preferably less than 2.5 wt. % and most preferably less than 2.0 wt. %, as determined by ISO 6964. The wt. % are based on the jacket weight. Suitable additives (24) are known, e.g. carbon black.

In one embodiment of the invention, the thermoplastic polymers (21) contain additives which are capable of increasing the contrast during marking with a laser ("additives for laser marking" (23)). These may be phyllosilicates from the mica family. Examples include additives which are commercially available as Iriotec™ from Merck KgaA. The content of these additives in the jacket material is below 3 wt. %, preferably below 2.5 wt. %, most preferably below 2.0 wt. %. The wt. % are related to the jacket weight.

Without being bound by any theory, it is assumed that in the case of the known pipes, the outer jackets tend to be damaged in the conditions of assembly on the construction site or during transportation. The lower the outside temperatures, the more pronounced the risk of damage. Damage to the outer jacket appears to have a negative impact on thermal insulation performance, not only at the point of damage but over wide areas. The selection of the outer jackets described here ensures a consistently high thermal insulation.

Outer jackets (2) consisting of a corrugated LLDPE pipe and having in particular the melt flow index and modulus values mentioned here prove to be particularly suitable. The superiority of LLDPE as a jacket material over HDPE is demonstrated in a deflection test. Here, the pipes are cooled for 24 h at −10° C. and then bent over a radius of 400 mm. Here, both pipes prove suitable in principle, but the LLDPE pipe is superior in its properties. The effect is particularly clear in pipes according to the invention when thermal insulation (3) and outer jacket (2) form a composite; or when thermal insulation (3), foil (5) and outer jacket (2) form a composite. Such pipes with LLDPE as polymer (21) are thus particularly preferred embodiments of the invention.

Furthermore, outer jackets (2) consisting of a corrugated (sinusoidal or corrugated) LDPE-LLDPE pipe and having in particular the melt index and modulus values mentioned here prove to be particularly suitable. Such polymer mixtures, also called blends, of LDPE and LLDPE prove to be advantageous in continuous production. Polymer blends with 50-95% LLDPE and 5-50% LDPE are suitable, preferably 70-95% LLDPE and 5-30% LDPE, for example 90%

LLDPE and 10% LDPE. These pipes show comparably good values in the deflection test, and can be produced reliably and without defects using continuous equipment. The effect is particularly clear in pipes according to the invention when the thermal insulation (3), foil (5) and outer jacket (2) form a composite. Such pipes with LLDPE/LDPE melts as polymer (21) are thus a further particularly preferred embodiment of the invention.

Thermal Insulation (3):

The thermal insulation partially or completely encloses the medium pipe, preferably completely. The thermal insulation can be homogeneous along its cross-section or made up of several layers. Typically, the thermal insulation in line pipes is homogeneously constructed.

Foamed plastics ("foams") that contain a cell gas in their cells are particularly suitable as thermal insulation. The thermal insulation comprises (i.e. contains or consists of) one or more foams, preferably consisting of one foam. The term includes rigid foams and flexible foams.

Foams can be closed-cell or open-cell, preferably closed-cell, particularly as outlined in the standard ISO 4590, Third Edition, 2016 Jul. 15. The problem with the known pipes, which contain open-cell foams for insulation, is the fact that they are neither longitudinally watertight (in the sense of the standard EN 15632-2: 2010+A1:2014) and have comparatively poorer thermal insulation. The pipes according to the invention therefore have a smaller outer diameter (with comparable insulation properties). This makes it possible to provide more compact pipes with the same thermal performance, with the advantages of reduced space requirements for the pipes during transport and installation, as well as the possibility of realizing smaller bending radii.

A wide range of foams is suitable. Such foams are known per se, particularly suitable are foams that meet the standards DIN EN 253:2015-12 (especially for CMR) and EN15632-1: 2009+A1:2014, EN15632-2: 2010+A1:2014 and EN15632-3: 2010+A1:2014 (especially for PMR).

Preferably, such foams are selected from the group of polyurethanes (PUR) and polyisocyanurates (PIR). Polyurethanes and polyisocyanurates are known foam classes which are formed from the components disocyanate and diol (or polyol), the so-called 2K mixture. The distinguishing feature between PUR and PIR is the isocyanate index of the 2C mixture; this is in the range of 100-130 for PUR and 140-200 for PIR. These different ratios lead to the formation of cyclic isocyanurate structures in PIR, which are absent in PUR.

The isocyanate index is described, for example, in: The Polyurethanes Book, Ed. D. Randall and S. Lee, John Wiley 2002, ISBN 0-470-85041-8, p. 449.

In one embodiment of the invention, the starting materials of the foam, i.e. isocyanates and polyols in the case of PUR or PIR, have a reaction or start-up time of 10-60 s, preferably 15-45 s. Such a starting time has proven to be advantageous for the manufacturing process as described below.

The two-component mixture used to produce the foam can additionally contain physical blowing agents. Hydrofluoroolefins and (cyclo) alkanes are suitable, for example.

In one embodiment of the invention, the foam has a density in the range 30-80 kg/m$^3$, preferably 35-75 kg/m$^3$, most preferably 40-70 kg/m$^3$ (determined according to ISO 845:2006). Compared to commercially available pipes, this value is to be regarded as low.

In one embodiment of the invention, the foam has a modulus of 10-30 MPa, preferably 12-25 MPa, most preferably 14-23 MPa (determined according to DIN EN ISO 527-4:1997-07 for the cured foam). Compared to commercially available pipes, this value is to be regarded as low.

In one embodiment of the invention, the foam has a compressive strength of the cured foam of 0.10-0.30 MPa, preferably 0.12-0.28 MPa, most preferably 0.14-0.26 MPa (determined according to ISO 844:2014, at 10% compression for the cured foam). Compared to commercially available pipes, this value is to be considered low.

Thermal insulation (3) consisting of a closed-cell PIR foam (31) and having, in particular, the low values for density, modulus and compressive strength mentioned here have proved to be particularly suitable.

Thermal insulations (3) consisting of a closed-cell PUR foam (31) and having, in particular, the low values for density, modulus and compressive strength mentioned here prove to be particularly suitable.

Thermal insulations (3) consisting of a closed-cell PUR foam (31) have proven to be particularly suitable, and in particular their starting materials have a reaction or start-up time of 10-60 s.

Also suitable, for certain applications, are thermal insulations (3) consisting of an open-cell PE foam (31) and having the parameters mentioned here.

Medium pipe (4): In principle, all medium pipes suitable for thermally insulated pipes can be used. Suitable medium pipes can be rigid or flexible; flexible medium pipes are preferred so that the pipes can be reeled up. A pipe according to the invention may comprise one or more medium pipes. In one embodiment, the pipe according to the invention comprises a single medium pipe. In another embodiment, the pipe according to the invention comprises two medium pipes.

The medium pipe can be made of polymeric materials (possibly with a metallic coating) or metallic materials. Such materials are known per se and are commercially available or manufactured by known processes. The materials are selected by the skilled person according to the intended use, if necessary after routine tests.

In one embodiment, said medium pipe (4) is a flexible plastic pipe, the plastic selected from the group consisting of acrylonitrile-butadiene-styrene (ABS), cross-linked polyethylene (PEXa, PEXb, PEXc), PE, polybutene (PB), polyethylene raised temperature (PE-RT). Such medium pipes are commercially available.

In a further embodiment, said medium pipe (4) is a flexible plastic pipe with an outer metal layer, the plastic selected from the group ABS, PEXa, PEXb, PEXc, PE, PB, PE-RT, the metal selected from the group aluminium including its alloys. Such medium pipes are also known as composite pipes and are commercially available or can be manufactured by known methods.

In a further embodiment, said medium pipe (4) is a flexible metal pipe, the metal selected from the group of copper including alloys thereof, iron including alloys thereof (such as stainless steels), aluminium including alloys thereof.

Medium pipes (4) made of plastic (with or without metallic coating) are particularly suitable. Plastic pipes made of PE, PEx or PE-RT with or without metallic coating are particularly preferred.

Foil (5): A foil between the thermal insulation and the outer jacket is optional. Such a foil facilitates the manufacture of the pipe according to the invention and has a positive effect on the service properties.

Such foils are known per se; foils with a thickness of 0.01-0.20 mm, in particular 0.02-0.15 mm, are suitable. Suitable foil materials are known to the skilled person, e.g. polyamides, polyolefins, polyesters (including PET), in particular PET foils or polyamides are suitable.

The said foils (5) can be provided with a lamination (e.g. of PE or PP) on one or both sides. In addition, one or both outer sides of the foil (5) can have a surface coating, in particular a corona treatment.

The foil (5) can be partially or completely connected with thermal insulation (3) and/or outer jacket (2) or be present as a separate element. This depends in particular on the choice of foil material and the manufacturing conditions. Accordingly, the invention also relates to a thermally insulated pipe as described here, additionally comprising a foil (5) which is either (i) materially bonded to the thermal insulation (3) or (ii) materially bonded to the outer jacket (2) or (iii) materially bonded to the thermal insulation (3) and the outer jacket (2) or (iv) is present as a separate structural element.

It was found that thermally insulated pipes containing a foil (5) exhibit improved bendability. As mentioned above, a small bending radius is a desirable parameter in practice. Thus, the presence of a foil cooperatively interacts with the corrugation (22) of the outer jacket (2). Furthermore, the foil (5) enables the manufacturing processes (1-1) and (1-2) described below. The foil (5) is typically form-fitted, or substantially form-fitted, to the outer jacket (2). The terms "materially bonded" and "form-fitted" are familiar to those skilled in the art. It is obvious that in the context of the present invention, in addition to a form-fitting component, there may also be a materially bonded component, and vice versa.

The combination of the following features leads to particularly suitable pipes.

Pipe (1) as described herein, wherein the outer jacket (2) is made of LDPE and the thermal insulation (3) is made of a closed-cell PU foam and the foil (5) has a thickness of 0.01-0.2 mm.

Pipe (1) as described herein wherein the outer jacket (2) consists of a polymer blend of LLDPE and LDPE and the thermal insulation (3) consists of a closed cell PU foam and the foil (5) has a thickness of 0.01-0.2 mm.

Uses:

In accordance with the foregoing, the pipe described herein is suitable for use in a composite pipe system. The invention therefore also relates to a composite pipe system comprising thermally insulated pipes (1) as described herein and to the use of thermally insulated pipes as described herein for producing a composite pipe system.

In accordance with the foregoing, the pipe described herein is suitable for transporting cooling or heating media. The invention therefore also relates to the use of thermally insulated pipes as described herein for the provision of district heating, local heating, or cooling.

In a second aspect, the invention relates to various methods for manufacturing thermally insulated pipes. Analogous methods are known and described in the documents cited on p. 1. However, these documents do not refer to the specific starting materials used herein for the closed-cell foam (31) and the thermoplastic plastic (21).

In the inventive method, a distinction is made between whether a foil (5) is present or not.

In principle, the pipes (1) described here can be manufactured in analogy to the known methods. In doing so, the known starting materials are replaced by the starting materials described here. Accordingly, equipment known per se can be used for the production, if necessary after adaptation to new parameters as can be carried out by the skilled person in his routine activity. This aspect of the invention will be explained in more detail below.

Method 1-1: Continuous Production of Pipes (1) with Foil (5).

In this embodiment, the invention relates to a method for the continuous production of a pipe (1), which pipe comprises at least one medium pipe (4), a foamed thermal insulation (3) and a corrugated outer jacket (2) made of thermoplastic material, as well as a foil (5) between the outer jacket (2) and the thermal insulation (3), comprising the steps:
(a) forming a foil tube around the at least one medium pipe (4) and introducing the foam-forming starting material for forming the foamed thermal insulation into the foil tube,
(b) passing the medium pipe with the foil tube through an extrusion head by means of which the outer jacket (2) is extruded annularly, and
(c) generating the waveform of the outer jacket (4); in particular in a corrugator.

Advantageously, in this embodiment, the outer jacket is fed into the corrugator separately from the medium pipe surrounded by the foil tube and formed in the corrugator.

Advantageously, in this embodiment, the foamed thermal insulation (3) is formed in the previously corrugated outer jacket.

Advantageously, in this embodiment, the outer jacket is formed in the corrugator by using vacuum to form the corrugated shape (22).

Advantageously, in this embodiment a foam-forming starting material is used whose reaction time or starting time is adjustable. Suitable starting materials can be set to a reaction time or start time of 10 seconds to 60 seconds, in particular 15 seconds to 45 seconds.

Advantageously, in this embodiment, the formation of the foamed thermal insulation is delayed by cooling, with cooling of the foil tube with the starting material contained therein for the formation of the foamed thermal insulation taking place in particular when the medium pipe with the foil tube passes through the die head.

Advantageously, in this embodiment, the medium pipe (4) surrounded by the foil tube is guided through the die head by means of a protective tube, the protective tube being guided into the closed mold jaws (B) of the corrugator. Advantageously, such protective tubes are provided on the inside, and preferably also on the outside, with a friction-reducing coating, in particular with a coating containing or consisting of (PTFE). Advantageously, such protective tubes are adjustable in the longitudinal direction of the extruder, the position of its front end in the corrugator being set in such a way that the outer jacket is completely formed in the section of the corrugator running around the protective tube.

Advantageously, in this embodiment the method is carried out continuously at a speed of 2-10 m/min. The tubes obtained in this way are either cut to length, typically into tube sections of 1-10 m, or rolled onto drums ("reeled up"), typically into tube sections of 20-500 m in length.

Method 1-2: Discontinuous Production of Pipes (1) with Foil (5).

In this embodiment, the invention relates to a method for discontinuous production of a pipe (1), which pipe comprises at least one medium pipe (4), a foamed thermal insulation (3) and a corrugated outer jacket (2) made of thermoplastic material, as well as a foil (5) between the outer jacket (2) and the thermal insulation (3), comprising the steps:
(a) forming a foil tube around the medium pipe (4);
(b) inserting the medium pipe with the foil tube into a corrugated pipe, followed by stabilization of the medium pipe by an inner pipe (F), if necessary;

(c) closing the construction thus obtained at one of the two ends with a flange (A).
(d) introducing the foam-forming starting material for the formation of the foamed thermal insulation into the gap between the medium pipe and the foil tube.
e) closing the construction thus obtained at the open end with a flange provided with a vent hole through which the air displaced by the produced foam can escape.
f) closing the vent hole with a plug before the produced foam arrives at the vent hole.
g) removing the flanges after the foam has cured.

Accordingly, in this embodiment, the corrugated outer jacket is produced in a separate step.

Method 2: Production of Pipes (1) without Foil (5):

In this embodiment, the invention relates to a method for producing a pipe (1), which pipe comprises at least one medium pipe (4), a foamed thermal insulation (3) and a corrugated outer jacket (2) made of thermoplastic material but no foil (5) between the outer jacket (2) and the thermal insulation (3), comprising the steps:
(a): inserting the medium pipe into a corrugated pipe, followed by stabilization of the medium pipe by an inner pipe (F), if necessary;
(b) closing the construction thus obtained at one of the two ends with a flange (A).
(c) introducing the foam-forming starting material for the formation of the foamed thermal insulation into the gap between the medium pipe and the corrugated pipe; for example, with a lance.
(d) closing the construction thus obtained at the open end with a flange provided with a vent hole through which the air displaced by the produced foam can escape.
(e) closing the vent hole with a plug before the produced foam arrives at the vent hole.
f) removing the flanges after the foam has cured.

In a third aspect, the invention relates to a composite material (6), also called composite or composite work material. These composite materials are widely applicable for thermal insulation, and are particularly suitable as a component of the thermally insulated pipe and composite pipe systems described herein. This aspect of the invention will be explained in more detail below.

The term composite material is well known in itself and refers in particular to a material consisting of two or more joined materials, and which has different material properties than its individual components. Material properties and geometry of the components are relevant for the properties of composite materials. The connection is made by material bonding or form fit or a combination of both. In particular, the invention relates to composite materials from the group of layered composite materials, also called laminates.

In one embodiment, the invention relates to a composite material (6) comprising a first polymer (31) in direct contact with a second polymer (21), wherein said first polymer is a closed cell foam (31) as defined in the 1st aspect of the invention; and said second polymer is a thermoplastic material (21) as defined in the 1st aspect of the invention. Said polymers (31) and (21) may comprise the same or different monomers, preferably they comprise different monomers.

In one embodiment, the invention relates to a composite material (6) comprising a first polymer (31), a second polymer (21) and a foil (5) disposed therebetween, wherein said first polymer is a foam as defined in the 1st aspect of the invention (in particular a closed cell foam); and said second polymer is a thermoplastic material as defined in the 1st aspect of the invention; and said foil is as defined above; and said polymers (31) and (21) are preferably of different monomers; and said foil forms a composite with the first and second polymers.

In a further advantageous embodiment, the first polymer (31) is selected from the group comprising polyurethanes (PU), in particular closed cell polyurethanes.

In another advantageous embodiment, the first polymer (31) is selected from the group comprising polyisocyanurates (PIR).

In another advantageous embodiment, the second polymer (21) is selected from the group comprising polyethylene (PE) and polypropylene (PP).

In another advantageous embodiment, said foil (5) is selected from the group comprising PET and polyamide.

The invention further relates to the use of a composite material (6) as described herein
for the production of thermally insulated pipes;
for the production of thermally insulated containers;
For the manufacture of thermally insulated insulation elements such as joints, connectors or cover devices (particularly suitable for connecting the inventive pipes);
For the production of thermally insulated insulation elements on vehicles (including motor vehicles, rail vehicles, ships, aircraft);
For the production of thermally insulated insulation elements on buildings (including panels for interior or exterior insulation, window and door frames); as well as
for the production of pipe composite systems.

In a fourth aspect, the invention further relates to methods for producing a composite material (6) as described herein. In principle, the composite materials described herein can be produced in analogy to the known methods. Thereby, the known starting materials are replaced by the starting materials described herein. Accordingly, equipment known per se can be used for the production, if necessary after adaptation to new parameters, as can be carried out by the person skilled in the art in his routine activities.

The examples given below serve to further explain the invention; they are not intended to limit the invention in any way.

1: Manufacturing of the Outer Jackets

Corrugated polyethylene (PE) pipes were produced using an HD 250-38 corrugator from Drossbach, Rain am Lech, Germany. The type of polyethylene used, the external topography and the weight per meter were varied. These corrugated pipes served as outer jackets for the thermally insulated pipes to be manufactured in Example 2.

The materials used were high-density polyethylene (HDPE) and linear low-density polyethylene (LLDPE).

The HDPE had a density of 955 kg/m$^3$ according to the D792 standard and a melt index of 0.35 g/10 min measured at a temperature of 190° C. and a load of 2.16 kg according to the ASTM D1238: 2013 standard. The modulus of elasticity was experimentally determined to be 1267 MPa, according to the ASTM D1238: 2013 standard.

The LLDPE had a density of 920 kg/m$^3$ according to ASTM D792: 2013 standard and a melt index of 0.90 g/10 min measured at a temperature of 190° C. and a load of 2.16 kg according to ASTM D1238: 2013 standard. The elastic modulus was experimentally determined to be 491 MPa according to ASTM D1238: 2013 standard.

Figure 7:
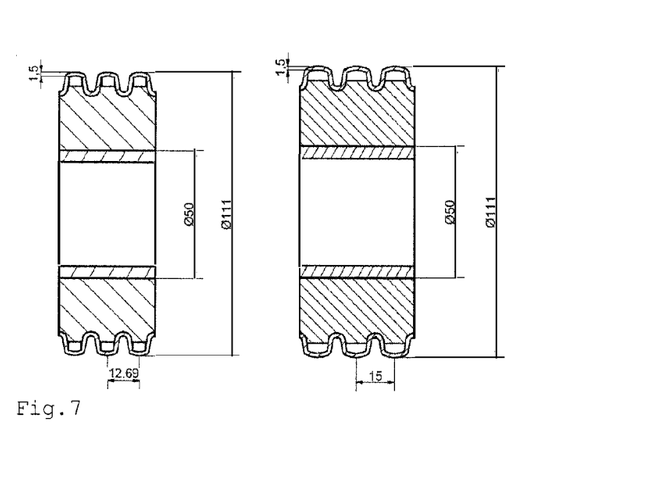
FIG. 7: Representation of the geometries of corrugated pipes produced with jaw mold 1 (left) and jaw mold 2 (right).

Two different sets of jaws were used to produce different topographies. These are designated as jaw shape 1 and jaw shape 2 and are characterized in more detail in FIG. 7.

The weight of these corrugated pipes was determined by weighing and the result was given as weight per meter in the unit g/m, see Table 1 and 2.

By changing the belt speed or adjusting the discharge rate of the extruder, samples with graduated weights per meter were obtained.

2: Making the Insulated Pipes

The production of the insulated pipes is illustrated in FIG. 1. The jackets (2), (C in FIG. 1A) from example 1 were further processed in the following step to insulated pipes; cf. FIG. 1. For this purpose, a medium pipe ((4), (E) in FIG. 1A) made of cross-linked polyethylene (PEX) with an outer diameter of 50 mm and a wall thickness of 4.6 mm was surrounded with a foil tube (5). This foil tube consisted of a foil of thickness 0.08 mm made of polyethylene terephthalate (PET) and had a circumference of 335 mm.

To straighten the PEX pipe, a steel pipe (inner pipe (F) in FIG. 1) with an outer diameter of 38 mm was pushed through as an aid.

The length of the PEX pipe was 2040 mm, the length of the steel pipe was 2200 mm, the length of the outer casing was 1970-2000 mm.

The PEX pipe (E) with the foil tube and the inner steel pipe (F) was pushed into the corrugated outer jacket (C) and closed at the end with a flange (A). The entire assembly was supported on a table and tilted at an angle of 5°. The outer jacket was fixed with the appropriate forming jaws (B) to prevent bending or deformation of the tube during foaming.

The two-component mixture of polyol and isocyanate was injected into the gap between the tubular foil and the PE pipe at the slightly raised end of the pipe structure using a lance.

Two different polyurethane foams were used to manufacture the sample pipes.

One of the two foams is given the designation "soft" for the following design. The following properties were determined experimentally on the cured foam: compressive strength at 10% compression at 0.14 MPa, measured according to the standard ISO 844:2014. The modulus of elasticity at 14.3 MPa according to the standard IN EN ISO 527-4: 1997-07 These values were obtained on specimens with a density of 65.2 kg/m$^3$, determined according to the standard ISO 845:2006.

The other polyurethane foam used is designated "hard" for the following description. The following properties were determined experimentally on the cured foam: compressive strength at 10% compression at 0.27 MPa, measured according to the standard ISO 844:2014. The modulus of elasticity at 25.0 MPa according to the standard DIN EN ISO 527-4: 1997-07. These values were obtained on specimens with a density of 63.3 kg/m$^3$, determined according to the standard ISO 845:2006.

The manufactured tube samples and the material combinations are summarized in Tables 1 and 2. The pipes tested here comply with the EN 15632 standard.

3: Measurement of Deflection Forces

The force required to deflect the respective pipe by a certain amount was determined on each of the pipe samples.

Figure 2:
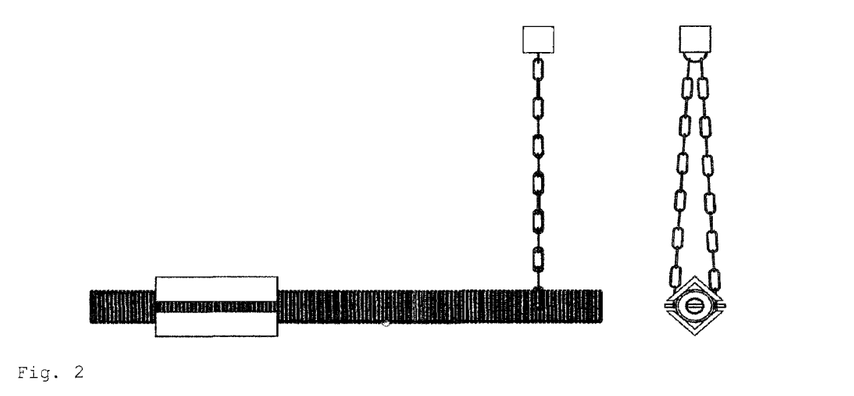
FIG. 2 shows setup for Ex. #3, measurement of deflection forces.

For this purpose, the pipe was clamped as shown in FIG. 2. The distance between the fixed point and the point of application of the connection to the load cell was 1100 mm. At the free end, the pipe was provided with a hole through which a threaded rod was pushed, to which in turn a chain was attached on the right and left, which was connected to the tensile load cell. The load cell was part of a universal testing machine of type Instron 3367. The free end of the pipe was pulled upwards at a speed of 50 mm. The force reached after a distance of 300 mm was recorded as a measured value.

Four individual values were measured on each individual pipe sample, with the pipe being rotated axially by 90° after each measurement. Thus, the measurement at the positions 0°, 90°, 180° and 270° resulted in the four individual values. The table shows the individual values for each pipe and the mean value resulting from these four individual measurements.

At least two pipes of each type were measured, and the resulting mean values are highlighted in bold in Tables 1 and 2.

Figure 4:
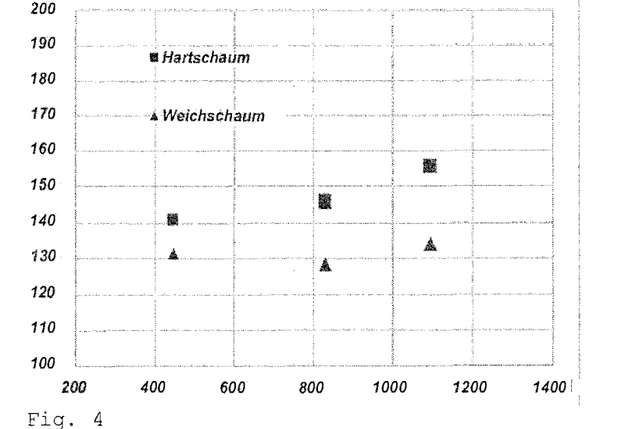
FIG. 4: Graph of the deflection force (y-axis in N) versus the weight per meter of the corrugated jacket (x-axis in g/m) for thermally insulated pipes with a jacket made of LLDPE and with the two tested polyurethane foams "hard" and "soft" at jaw shape 1.
Figure 5:
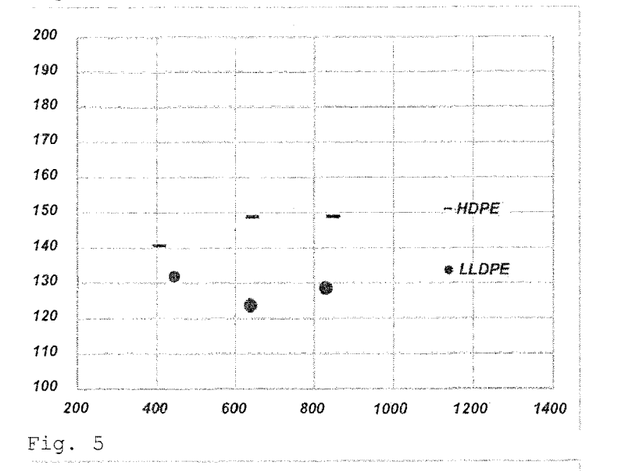
FIG. 5: Graph of the deflection force (y-axis in N) versus the weight per meter of the corrugated jacket (x-axis in g/m) for thermally insulated pipes with the "soft" polyurethane foam and with the two jacket materials of HDPE and LLDPE for jaw shape 1.
Figure 6:
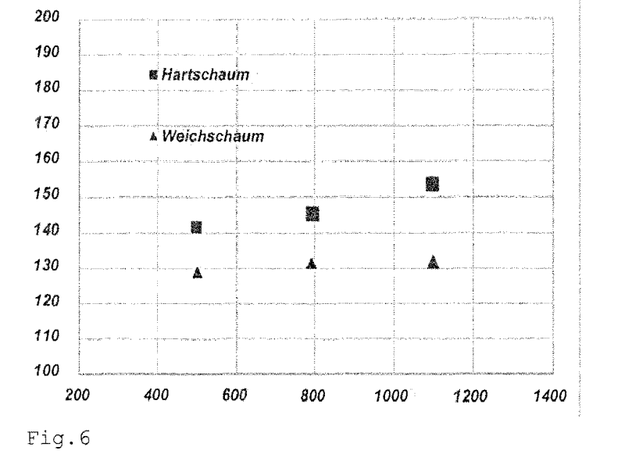
FIG. 6: Graph of the deflection force (y-axis in N) versus the weight per meter (x-axis in g/m) for thermally insulated pipes with the polyurethane foam "soft" (triangles) and "hard" (squares) for the jacket material LLDPE and the jaw shape 2.

In the graphical application, the averaged meter weights of the outer jackets highlighted in bold and the averaged values of the deflection forces highlighted in bold were used. This is shown in FIGS. 4, 5 and 6.

It is clearly evident that the lowest deflection forces are achieved when LLDPE instead of HDPE is used as the material for the outer jacket.

It is also clear that the lowest deflection forces are achieved when a soft polyurethane foam is used instead of a hard polyurethane foam.

A combination of an HDPE jacket with a soft polyurethane foam is less suitable in total for achieving low deflection forces.

TABLE 1

Summary of measured values for different tube patterns shown graphically in FIGS. 4 and 5, jaw shape 1.

| No. | Jacket material | Foam type | Outer jacket weight per meter | | Deflection force | |
|---|---|---|---|---|---|---|
| | | | Single values [g/m] | Mean value [g/m] | Single values [N] | Mean value [N] |
| 118 | HDPE | Hard | 406 | — | 143/138/136/150 | 142 |
| 119 | HDPE | Hard | 409 | — | 140/151/136/134 | 140 |
| | | | | 408 | | 141 |
| 143 | HDPE | Hard | 645 | — | 155/158/152/148 | 153 |
| 144 | HDPE | Hard | 643 | — | 140/149/149/139 | 149 |
| | | | | 644 | | 149 |
| 172 | HDPE | Hard | 849 | — | 158/152/150/147 | 152 |
| 173 | HDPE | Hard | 848 | — | 144/152/145/141 | 146 |
| | | | | 848 | | 149 |
| 277 | LLDPE | Hard | 446 | — | 153/132/132/140 | 139 |
| 278 | LLDPE | Hard | 447 | — | 143/147/137/141 | 142 |
| | | | | 447 | | 140 |
| 321 | LLDPE | Soft | 638 | — | 143/152/155/144 | 148 |
| 326 | LLDPE | Soft | 638 | — | 136/129/127/128 | 130 |
| 327 | LLDPE | Soft | 638 | — | 112/120/112/107 | 112 |
| 328 | LLDPE | Soft | 638 | — | 101/111/105 (98 | 104 |
| | | | | 638 | | 124 |
| 338 | LLDPE | Hard | 828 | — | 151/152/163/160 | 157 |

TABLE 1-continued

Summary of measured values for different tube patterns shown graphically in FIGS. 4 and 5, jaw shape 1.

| No. | Jacket material | Foam type | Outer jacket weight per meter Single values [g/m] | Outer jacket weight per meter Mean value [g/m] | Deflection force Single values [N] | Deflection force Mean value [N] |
|---|---|---|---|---|---|---|
| 339 | LLDPE | Hard | 827 | — | 137/132/143/138 | 137 |
| 345 | LLDPE | Hard | 828 | — | 148/146/142/141 | 144 |
|  |  |  |  | 828 |  | 146 |
| 470 | LLDPE | Hard | 1093 | — | 138/151/141/157 | 147 |
| 472 | LLDPE | Hard | 1091 | — | 175/163/159/161 | 164 |
| 475 | LLDPE | Hard | 1092 | — | 164/164/151/152 | 158 |
| 476 | LLDPE | Hard | 1096 | — | 165/149/148/154 | 154 |
|  |  |  |  | 1095 |  | 156 |
| 289 | LLDPE | Soft | 447 | — | 132/133/125/126 | 129 |
| 291 | LLDPE | Soft | 450 | — | 121/126/121/123 | 123 |
| 295 | LLDPE | Soft | 445 | — | 130/139/135/129 | 133 |
| 304 | LLDPE | Soft | 304 | — | 143/142/139/132 | 139 |
|  |  |  |  | 447 |  | 131 |
| 353 | LLDPE | Soft | 832 | — | 113/115/124/120 | 118 |
| 355 | LLDPE | Soft | 830 | — | 132/131/128/132 | 131 |
| 358 | LLDPE | Soft | 827 | — | 134/129/131/124 | 130 |
| 362 | LLDPE | Soft | 832 | — | 138/141/128/138 | 136 |
|  |  |  |  | 830 |  | 129 |
| 477 | LLDPE | Soft | 1092 | — | 120/126/117/115 | 119 |
| 480 | LLDPE | Soft | 1093 | — | 138/140/129/132 | 135 |
| 481 | LLDPE | Soft | 1097 | — | 140/151/147/147 | 146 |
| 482 | LLDPE | Soft | 1098 | — | 136/141/139/132 | 137 |
|  |  |  |  | 1095 |  | 134 |

Conclusion: It can be clearly seen that the lowest deflection forces are achieved when LLDPE is used as the material for the outer jacket instead of HDPE.

It is also clear that the lowest deflection forces are achieved when a soft polyurethane foam is used instead of a hard polyurethane foam.

A combination of an HDPE jacket with a soft polyurethane foam is less suitable in total for achieving low deflection forces.

4: Influence of Foam Hardness with a Different Jacket Topography

The influence of foam hardness was also shown for another jacket topography. For this purpose, outer jackets were made of LLDPE as described in #1 using the jaws with the jaw mold 2 shown in FIG. 7. These outer jackets were now provided with a medium pipe and foamed out as described in Example 2. The deflection forces were determined on these samples as already described in Example 3.

The results are summarized in Table 2.

TABLE 2

Summary of measured values for different pipe patterns graphically shown in FIG. 6, jaw shape 2.

| No. | Jacket material | Foam type | Outer jacket weight per meter Single values [g/m] | Outer jacket weight per meter Mean value [g/m] | Deflection force Single values [N] | Deflection force Mean value [N] |
|---|---|---|---|---|---|---|
| 419 | LLDPE | Hard | 499 | — | 152/152/156/142 | 151 |
| 423 | LLDPE | Hard | 500 | — | 128/142/153/145 | 142 |
| 426 | LLDPE | Hard | 502 | — | 125/128/130/137 | 141 |
|  |  |  |  | 500 |  | 141 |
| 428 | LLDPE | Soft | 503 | — | 127/127/125/118 | 124 |
| 429 | LLDPE | Soft | 502 | — | 106/116/115/105 | 111 |
| 431 | LLDPE | Soft | 503 | — | 159/155/141/147 | 150 |
|  |  |  |  | 503 |  | 128 |
| 436 | LLDPE | Hard | 797 | — | 138/141/149/145 | 144 |
| 437 | LLDPE | Hard | 794 | — | 142/162/147/136 | 147 |
| 439 | LLDPE | Hard | 796 | — | 135/145/148/128 | 139 |
| 442 | LLDPE | Hard | 791 | — | 148/156/161/145 | 152 |
|  |  |  |  | 795 |  | 145 |
| 443 | LLDPE | Soft | 795 | — | 123/131/134/130 | 130 |
| 444 | LLDPE | Soft | 796 | — | 117/132/124/121 | 123 |
| 445 | LLDPE | Soft | 793 | — | 132/151/149/136 | 142 |
| 446 | LLDPE | Soft | 794 | — | 129/137/134/120 | 130 |
|  |  |  |  | 795 |  | 131 |
| 451 | LLDPE | Hard | 1099 | — | 153/163/163/167 | 162 |
| 453 | LLDPE | Hard | 1096 | — | 145/147/151/152 | 149 |
| 457 | LLDPE | Hard | 1099 | — | 145/156/155/143 | 150 |
| 458 | LLDPE | Hard | 1097 | — | 160/160/149/151 | 155 |
|  |  |  |  | 1098 |  | 154 |
| 460 | LLDPE | Soft | 1098 | — | 141/150/142/127 | 140 |
| 461 | LLDPE | Soft | 1098 | — | 114/126/131/127 | 124 |
| 462 | LLDPE | Soft | 1100 | — | 120/128/133/130 | 128 |
| 463 | LLDPE | Soft | 1100 | — | 133/142/133/136 | 136 |
|  |  |  |  | 1099 |  | 132 |

CONCLUSION

It can be seen that both jacket topographies lead to good results.

Again, it can be clearly seen that the deflection forces for the pipe patterns containing the softer foam are lower than those containing the harder foam.

While the present disclosure has been illustrated and described with respect to a particular embodiment thereof, it should be appreciated by those of ordinary skill in the art that various modifications to this disclosure may be made without departing from the spirit and scope of the present disclosure.

The present invention is further exemplified, but not limited to, the following embodiments.

Embodiment 1 wherein a thermally insulated pipe (1) comprises (a) at least one flexible, medium pipe (4), (b) at least one thermal insulation (3), which is arranged around the medium pipe, wherein the thermal insulation (3) comprises a foam (31) which has a density of 30-80 kg/m$^3$ according to ISO 845:2006, and is at least 60% closed cell according to ISO 4590, Third Edition, 2016 Jul. 15; and (c) at least one outer jacket (2), which is arranged around the thermal insulation, wherein the outer jacket (2) comprises a thermoplastic plastic (21) which has a waveform (22); and has a Young's modulus of 300-1400 MPa according to SN EN ISO 527-2/2012.

Embodiment 2 wherein the outer jacket (2) of a pipe of Embodiment 1 meets one or more of the following criteria: (a) the plastic (21) comprises a melt of LDPE and LLDPE; and (b) the melt index of the plastic (21) is between 0.1 and 25 g/10 min, measured at a load of 2.16 kg and a temperature of 190° C. according to DIN EN ISO 1133/2012.

Embodiment 3 wherein the thermal insulation (3) of the pipe of Embodiment 1 meets one or more of the following criteria: (a) the foam (31) comprises a polymer selected from the group consisting of polyurethanes (PU) and polyisocyanurates (PIR); (b) the foam (31) is at least 75% closed cell according to ISO 4590, Third Edition, 2016 Jul. 15; (c) the foam (31) has a compressive strength of 0.1-0.3 MPa according to ISO 844:2014 at 10% compression; and (d) the foam (31) has a Young's modulus of 10-30 MPa according to ISO 1926.

Embodiment 4 wherein the medium pipe (4) of Embodiment 1 is formed as a single pipe section and is selected from the group consisting of: (a) corrugated or smooth plastic pipe without metal coating; (b) corrugated or smooth metal-coated plastic pipe; and (c) corrugated or smooth metal pipe.

Embodiment 5 comprises a pipe of Embodiment 1 wherein (a) the outer jacket (2) has an outer diameter D, (b) the outer jacket (2) has a corrugated waveform characterized by wave length W, ridge width B and ridge height H, and (c) the pipe meets one of the following:
(i) D=40-70 mm, W=4-40% of D, B=5-50% of D, H=3-25% of D; or (ii) D=71-100 mm, W=4-40% of D, B=4-50% of D, H=2-25% of D; or (iii) D=101-130 mm, W=3-40% of D, W=3-50% of D, H=1-25% of D; or (iv) D=131-160 mm, W=3-40% of D, W=2-50% of D, H=1-25% of D; or
(v) D=161-250 mm, W=2-40% of D, W=1-50% of D, H=1-25% of D.

Embodiment 6 wherein, in the pipe of Embodiment 1, the medium pipe (4) and the thermal insulation (3) form a composite.

Embodiment 7 wherein the pipe of Embodiment 1 has an annular stiffness of at least 4 kN/m$^2$, preferably at least 10 kN/m$^2$, most preferably at least 15 kN/m$^2$ according to SN EN ISO 9969, 2016-05.

Embodiment 8 wherein the pipe of Embodiments 1-7 further comprise a foil (5) between the outer jacket (2) and the thermal insulation (3).

Embodiment 9 wherein the pipe the foil, of the pipe of Embodiment 8, complies with one or more of the following criteria: (a) the foil (5) comprises a material selected from the group consisting of PET, PE and PA; (b) the foil (5) has a total thickness of 0.01 to 0.2 mm; (c) the foil (5) has a lamination on at least one side; and (d) the foil (5) has a surface treatment on at least one side.

Embodiment 10 wherein the foil (5), of the pipe of Embodiment 8, has a total thickness of 0.02 to 0.15 mm and has a surface treatment.

Embodiment 11 wherein the pipe of Embodiment 1 further comprises a foil (5) arranged between the outer jacket (2) and the thermal insulation (3), wherein: (a) the foil (5) is connected to the thermal insulation (3) by a material bond and to the outer jacket (2) by a form fit; and the foil (5) has a thickness of 0.01-0.2 mm; (b) the outer jacket (2) consists of a polymer blend of LLDPE and LDPE, where LLDPE/LDPE=50/50 to 95/5, preferably LLDPE/LDPE=70/30 to 95/5; and (c) the thermal insulation (3) consists of a closed cell PU foam.

Embodiment 12 is a method for providing district heating or local heating, the method comprising the step of transporting heating media through a thermally insulated pipe of any of Embodiments 1-11.

Embodiment 13 is a method for providing district heating or local heating, the method comprising the step of transporting heating media through a thermally insulated pipe of any of Embodiments 1-11.

Embodiment 14 is a method for providing cooling, comprising the step of transporting cooling media through a thermally insulated pipe of any of Embodiments 1-11.

Embodiment 15 is a method for manufacturing a pipe (1), of any of Embodiments 8-11, comprising the steps of (a) forming a foil tube from the foil (5) around the at least one medium pipe (4) and introducing the foam-forming starting material for forming the closed cell foam (31) into the foil tube, (b) passing the medium pipe (4) with the foil tube through an extruder, by means of which the outer jacket (2) is extruded in a ring shape, and (c) generating the waveform of the outer jacket (4) in a corrugator.

Embodiment 16 is a method of Embodiment 15 wherein the outer jacket is fed into the corrugator separately from the medium pipe surrounded by the foil tube and is formed in the corrugator.

Embodiment 17 is a method of Embodiment 15 wherein the formation of the thermal insulation (3) takes place in the previously corrugated outer jacket.

The invention claimed is:

1. A thermally insulated pipe (1) comprising
   (a) at least one flexible, medium pipe (4),
   (b) one thermal insulation (3), which is arranged around the medium pipe, wherein the thermal insulation (3) comprises a foam (31) which
      (i) has a density of 30-80 kg/m$^3$ according to ISO 845:2006, and
      (ii) is at least 60% closed cell according to ISO 4590, Third Edition, 2016 Jul. 15; and
   (c) at least one outer jacket (2), which is arranged around the thermal insulation, wherein the outer jacket (2) comprises a thermoplastic plastic (21) which
      (i) has a waveform (22); and
      (ii) comprises a melt of LDPE and LLDPE.

2. The pipe according to claim 1 further comprising a foil (5) arranged between the outer jacket (2) and the thermal insulation (3), wherein:
   a) the foil (5) is connected to the thermal insulation (3) by a material bond and to the outer jacket (2) by a form fit;
   b) the foil (5) has a thickness of 0.01-0.2 mm;
   c) the outer jacket (2) consists of a polymer blend of LLDPE and LDPE, where LLDPE/LDPE=50/50 to 95/5, preferably LLDPE/LDPE=70/30 to 95/5; and
   d) the thermal insulation (3) consists of a closed cell PU foam.

3. The pipe according to claim 1, wherein the outer jacket (2) wherein the melt index of the plastic (21) is between 0.1 and 25 g/10 min, measured at a load of 2.16 kg and a temperature of 190° C. according to DIN EN ISO 1133/2012.

4. The pipe according to claim 3, further comprising a foil (5) between the outer jacket (2) and the thermal insulation (3).

5. The pipe according to claim 4, wherein the foil complies with one or more of the following criteria:
   a) the foil (5) comprises a material selected from the group consisting of PET, PE and PA;
   b) the foil (5) has a total thickness of 0.01 to 0.2 mm;
   c) the foil (5) has a lamination on at least one side; and
   d) the foil (5) has a surface treatment on at least one side.

6. The pipe according to claim 4, wherein the foil (5) has a total thickness of 0.02 to 0.15 mm and has a surface treatment.

7. The pipe according to claim 1, wherein the thermal insulation (3) meets one or more of the following criteria:
   a) the foam (31) comprises a polymer selected from the group consisting of polyurethanes (PU) and polyisocyanurates (PIR);
   b) the foam (31) is at least 75% closed cell according to ISO 4590, Third Edition, 2016 Jul. 15;
   c) the foam (31) has a compressive strength of 0.1-0.3 MPa according to ISO 844:2014 at 10% compression; and
   d) the foam (31) has a Young's modulus of 10-30 MPa according to ISO 1926.

8. The pipe according to claim 7, further comprising a foil (5) between the outer jacket (2) and the thermal insulation (3).

9. The pipe according to claim 8, wherein the foil complies with one or more of the following criteria:
   a) the foil (5) comprises a material selected from the group consisting of PET, PE and PA;
   b) the foil (5) has a total thickness of 0.01 to 0.2 mm;
   c) the foil (5) has a lamination on at least one side; and
   d) the foil (5) has a surface treatment on at least one side.

10. The pipe according to claim 8, wherein the foil (5) has a total thickness of 0.02 to 0.15 mm and has a surface treatment.

11. The pipe according to claim 1, wherein the medium pipe (4) is formed as a single pipe section and is selected from the group consisting of:
    a) corrugated or smooth plastic pipe without metal coating;
    b) corrugated or smooth metal-coated plastic pipe; and
    c) corrugated or smooth metal pipe.

12. The pipe according to claim 11, further comprising a foil (5) between the outer jacket (2) and the thermal insulation (3).

13. The pipe according to claim 12, wherein the foil complies with one or more of the following criteria:
    a) the foil (5) comprises a material selected from the group consisting of PET, PE and PA;
    b) the foil (5) has a total thickness of 0.01 to 0.2 mm;
    c) the foil (5) has a lamination on at least one side; and
    d) the foil (5) has a surface treatment on at least one side.

14. The pipe according to claim 12, wherein the foil (5) has a total thickness of 0.02 to 0.15 mm and has a surface treatment.

15. The pipe according to claim 1, wherein
    a) the outer jacket (2) has an outer diameter D,
    b) the outer jacket (2) has a corrugated waveform characterized by wave length W, ridge width B and ridge height H, and
    c) the pipe meets one of the following:
        (i) D=40-70 mm, W=4-40% of D, B=5-50% of D, H=3-25% of D; or
        (ii) D=71-100 mm, W=4-40% of D, B=4-50% of D, H=2-25% of D; or
        (iii) D=101-130 mm, W=3-40% of D, W=3-50% of D, H=1-25% of D; or
        (iv) D=131-160 mm, W=3-40% of D, W=2-50% of D, H=1-25% of D; or
        (v) D=161-250 mm, W=2-40% of D, W=1-50% of D, H=1-25% of D.

16. The pipe according to claim 15, further comprising a foil (5) between the outer jacket (2) and the thermal insulation (3).

17. The pipe according to claim 16, wherein the foil complies with one or more of the following criteria:
    a) the foil (5) comprises a material selected from the group consisting of PET, PE and PA;
    b) the foil (5) has a total thickness of 0.01 to 0.2 mm;
    c) the foil (5) has a lamination on at least one side; and
    d) the foil (5) has a surface treatment on at least one side.

18. The pipe according to claim 16, characterized in that the foil (5) has a total thickness of 0.02 to 0.15 mm and has a surface treatment.

19. The pipe according to claim 1, wherein the medium pipe (4) and the thermal insulation (3) form a composite.

20. The pipe according to claim 19, further comprising a foil (5) between the outer jacket (2) and the thermal insulation (3).

21. The pipe according to claim 20, wherein the foil complies with one or more of the following criteria:
    a) the foil (5) comprises a material selected from the group consisting of PET, PE and PA;
    b) the foil (5) has a total thickness of 0.01 to 0.2 mm;
    c) the foil (5) has a lamination on at least one side; and
    d) the foil (5) has a surface treatment on at least one side.

22. The pipe according to claim 20, wherein the foil (5) has a total thickness of 0.02 to 0.15 mm and has a surface treatment.

23. The pipe according to claim 1, wherein the pipe has an annular stiffness of at least 4 kN/m$^2$, preferably at least 10 kN/m$^2$, most preferably at least 15 kN/m$^2$ according to SN EN ISO 9969, 2016-05.

24. The pipe according to claim 23, further comprising a foil (5) between the outer jacket (2) and the thermal insulation (3).

25. The pipe according to claim 24, wherein the foil complies with one or more of the following criteria:
    a) the foil (5) comprises a material selected from the group consisting of PET, PE and PA;
    b) the foil (5) has a total thickness of 0.01 to 0.2 mm;
    c) the foil (5) has a lamination on at least one side; and
    d) the foil (5) has a surface treatment on at least one side.

26. The pipe according to claim 24, wherein the foil (5) has a total thickness of 0.02 to 0.15 mm and has a surface treatment.

27. The pipe according to claim 1, further comprising a foil (5) between the outer jacket (2) and the thermal insulation (3).

28. The pipe according to claim 27, wherein the foil complies with one or more of the following criteria:
    a) the foil (5) comprises a material selected from the group consisting of PET, PE and PA;
    b) the foil (5) has a total thickness of 0.01 to 0.2 mm;

c) the foil (5) has a lamination on at least one side; and
d) the foil (5) has a surface treatment on at least one side.

29. The pipe according to claim 27, wherein the foil (5) has a total thickness of 0.02 to 0.15 mm and has a surface treatment.

30. A method for providing district heating or local heating, the method comprising the step of transporting heating media through a thermally insulated pipe according to claim 1.

31. A method for providing district heating or local heating, the method comprising the step of transporting heating media through a thermally insulated pipe according to claim 2.

32. A method for providing cooling, comprising the step of transporting cooling media through a thermally insulated pipe according to claim 1.

33. A method for manufacturing a pipe (1) according to claim 27 comprising the steps:

(a) forming a foil tube from the foil (5) around the at least one medium pipe (4) and introducing the foam-forming starting material for forming the closed cell foam (31) into the foil tube, (b) passing the medium pipe (4) with the foil tube through an extruder, by means of which the outer jacket (2) is extruded in a ring shape, and (c) generating the waveform of the outer jacket (4) in a corrugator.

34. The method of one of claim 33 wherein the outer jacket is fed into the corrugator separately from the medium pipe surrounded by the foil tube and is formed in the corrugator.

35. The method of one of claim 34 wherein, wherein the formation of the thermal insulation (3) takes place in the previously corrugated outer jacket.

\* \* \* \* \*